E. A. ADERHOLT.
CULTIVATOR.
No. 182,399. Patented Sept. 19, 1876.
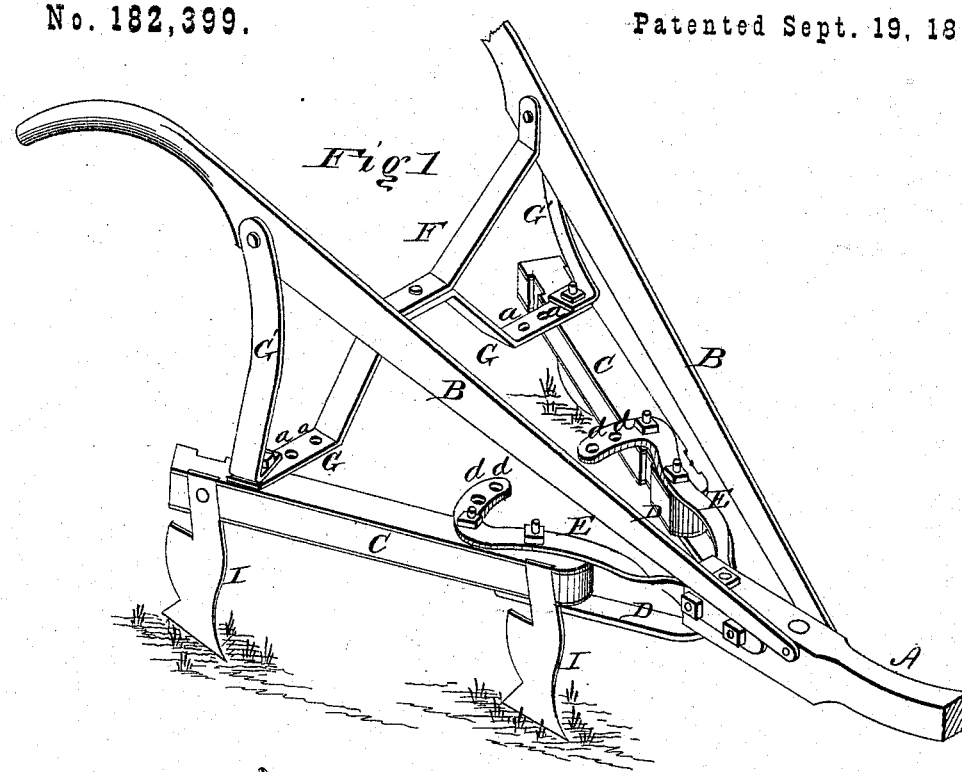
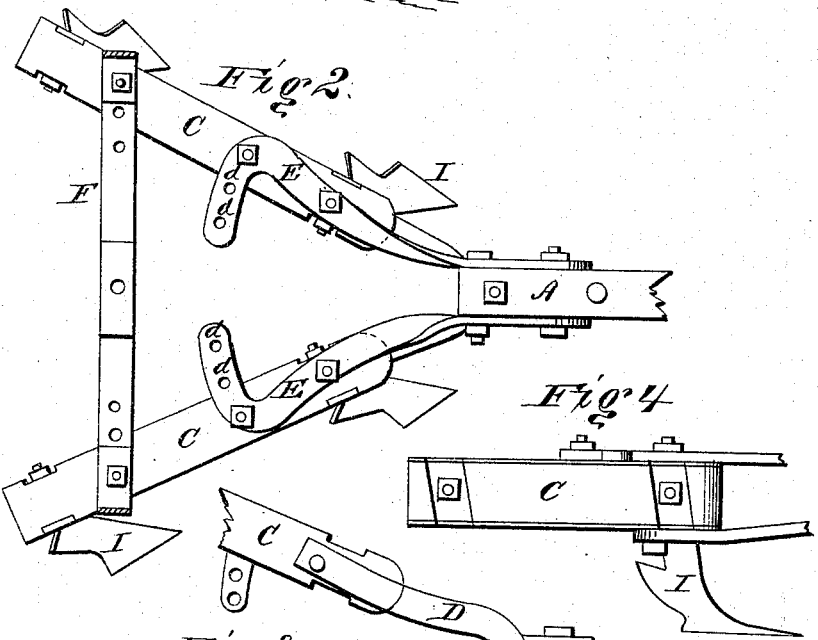
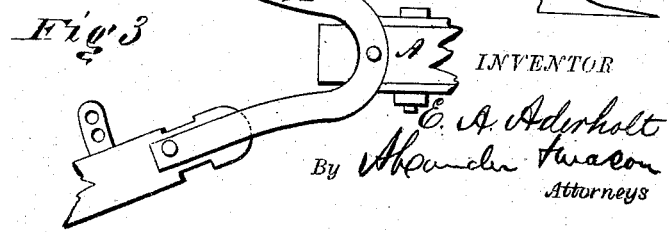
WITNESSES
F. L. Ourand
Henry N. Miller
INVENTOR
E. A. Aderholt
By Alexander Mason
Attorneys
N. PETERS, PHOTO-LITHOGRAPHER, WASHINGTON, D.C.

UNITED STATES PATENT OFFICE.

EDWARD A. ADERHOLT, OF OXFORD, ALABAMA.

IMPROVEMENT IN CULTIVATORS.

Specification forming part of Letters Patent No. 182,399, dated September 19, 1876; application filed April 15, 1876.

*To all whom it may concern:*

Be it known that I, EDWARD ALEXANDER ADERHOLT, of Oxford, in the county of Calhoun, and in the State of Alabama, have invented certain new and useful Improvements in Cultivators; and do hereby declare that the following is a full, clear, and exact description thereof, reference being had to the accompanying drawings, and to the letters of reference marked thereon, making a part of this specification.

The nature of my invention consists in the peculiar construction and arrangement of a harrow and cultivator frame, whereby the same can be expanded and contracted to suit the nature of the work to be performed.

In the accompanying drawings, making part of this specification, Figure 1 represents a perspective view; Fig. 2, a plan view, and Figs. 3 and 4 detached portions.

On the figures, A represents the main beam, and C C two side beams, the teeth for harrowing or cultivating being attached to the latter. The side beams are connected to the main beam by means of the bars E and D. The bar D is a single piece of metal, and in the form of a bow, as seen in Fig. 3. This bow is bolted to the under side of the beams, both the main and the side, a single bolt passing through each. The bars E are two in number, and are bolted to the sides of the main beam, and are then twisted so that they can be bolted on top of the side beams. Their ends are curved inward, and are graduated with a series of holes. A bolt passes through one of these holes, and then through the side beam. The holes in the curved ends of the bars E E allow the side beams, which set at an angle to the main beam, to have the angle varied, so that the implement can be adjusted to close or open work. F and G represent two bars, which connect the handles together, as also the outer ends of the two side beams. The bars G have one end secured to the outer sides of one handle, then pass down, bend at right angles, and are bolted to the side beams, and act as braces. The bar F is secured at each end to the insides of the handles. The bar G is provided near each end with a series of graduated holes, through which a bolt passes to secure it to the side beams. The bars G and F meet at their centers, and are there firmly secured together. By loosening up the bolts which pass through the graduated holes in the bars E and G the side beams may be opened or closed, and the angle changed, so that the harrow or cultivator teeth will cover more or less ground, and may be regulated to suit different kinds of grain and cultivation.

The side beams and the shanks of the cultivator-teeth are so constructed that said shanks may be shifted from one side of the beam to the other, and will fit snugly when bolted in position.

Having thus fully described my invention, what I claim as new, and desire to secure by Letters Patent, is—

1. The beams A and C C, in combination with the bow D and the bars E E, with graduated holes for holding and spreading the front of the side beams, as is herein set forth.

2. The bars G F and G' G', in combination with the beams C C, the handles, and the bars E E, and bow D, as and for the purpose set forth.

In testimony that I claim the foregoing I have hereunto set my hand this 3d day of March, 1876.

EDWARD ALEXANDER ADERHOLT.

Witnesses:
 M. L. STOWELL,
 D. F. SHUFORD.